United States Patent [19]

Jager

[11] 4,310,822

[45] Jan. 12, 1982

[54] TEMPERATURE CONTROL DEVICE FOR AQUARIUM HEATER

[75] Inventor: Wolfgang Jager, Wustenrot-Finsterrot, Fed. Rep. of Germany

[73] Assignee: Ebo-Jager, Inc., El Segundo, Calif.

[21] Appl. No.: 122,436

[22] Filed: Feb. 19, 1980

[30] Foreign Application Priority Data

Jul. 6, 1979 [DE] Fed. Rep. of Germany ....... 2927292

[51] Int. Cl.³ ............................................. H01H 71/16
[52] U.S. Cl. ........................................ 337/53; 337/57; 337/343
[58] Field of Search ...................... 337/343, 53, 57, 89, 337/92, 131, 318, 365, 368, 390

[56] References Cited

U.S. PATENT DOCUMENTS

| | | | |
|---|---|---|---|
| 2,658,975 | 11/1953 | Zuckerman | 337/53 |
| 2,776,352 | 1/1957 | Davis | 337/57 |
| 3,222,481 | 12/1965 | Lorenz | 337/53 |

Primary Examiner—Harold Broome

Attorney, Agent, or Firm—Charles H. Schwartz; Ellsworth R. Roston

[57] ABSTRACT

A temperature control device for use with an aquarium heater, including a control housing, a first contact fastened to the control housing, a second contact responsive to the temperature responsive movement of a bimetallic strip maintained at the control housing and movable between a closed position wherein the second contact abuts the first contact and an open position wherein the second contact is separated from the first contact, a plate spring, the second contact fastened at the free end of the plate spring and with the plate spring mounted on the control housing and movable through an unstable intermediate position between a first stable position wherein the contacts lie abuting one another and a second stable position wherein the contacts are separated from one another, and the plate spring abuting a stop on the control housing and with the bimetallic strip abuting the plate spring and moving the plate spring in response to temperature changes between the first and second positions.

10 Claims, 2 Drawing Figures

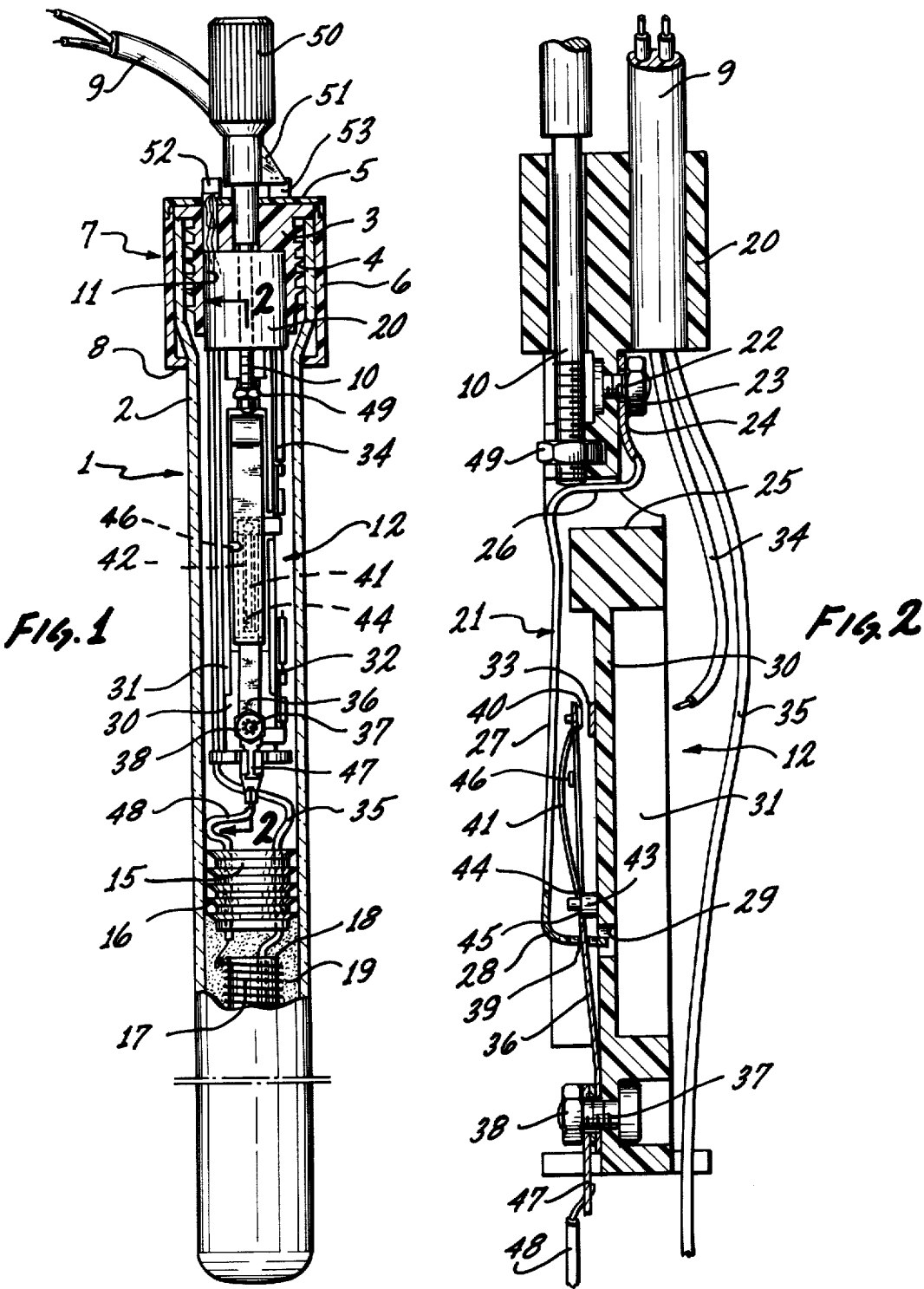

TEMPERATURE CONTROL DEVICE FOR AQUARIUM HEATER

The present invention relates to a temperature control device for aquarium heaters. Specifically, the temperature control device includes a control housing having a first contact mounted thereon. A second contact is at the end of a bimetallic strip also mounted on the housing and is movable due to the temperature responsive movement of the bimetallic strip between a closed position, in which it abuts the first contact, and an open position in which it is removed from the first contact.

In an aquarium heater, the desired temperature is provided by switching an electric heater off and on by way of a temperature responsive switch. It is known to use as a switch element a bimetallic strip fastened to a control housing, which bimetallic strip bends more or less according to the ambient temperature. The free end of the bimetallic strip is, in such a prior art structure provided with a contact, which contact in a switch-on position touches a second contact supported on the control housing.

In order to attain a stable switch-on position at an ambient temperature which is close to the switching temperature of the bimetallic strip, the prior art provided at the control housing a magnet to hold the bimetallic strip in the switch-on position by attracting the bimetallic strip. Even with slight fluctions of temperature in the range of the switching temperature, or with mechanical vibrations, the bimetallic strip remains stable in the switch-on position. When the mechanical tension of the bimetallic strip changes sufficiently due to a change in temperature, then the free end of the strip moves to break the contacts and to overcome the force of the magnet.

The prior art construction fulfills its intended object, but the manufacture of this prior art control circuit is costly. Also it is difficult to control the temperature setting since it is affected by the distance from the bimetallic strip to the magnet. Furthermore, the cost of the material for the magnet is expensive, so that circuit controls of the prior art construction are expensive.

An object of the present invention is to improve a control circuit particularly for use in an aquarium heater so that the construction of the control circuit is simplified and is less expensive. Moreover, the switching accuracy of the control circuit of the present invention is increased.

The objectives of the present invention are attained with a second contact positioned at the free end of a plate spring adjacent the first contact on the control housing and with the plate spring mounted on the control housing. The plate spring is moved through an unstable intermediate position from a first stable position, in which the contacts lie in contact with one another, to a second stable position in which the contacts are separated and the plate spring abuts a stop mounted on the control housing. The bimetallic strip abuts the plate spring and moves the plate spring between the stable positions in response to temperature changes for controling the aquarium heater.

In using the plate spring which is bistable, the switching accuracy may be substantially increased as compared with conventional switches in which the bimetallic spring is held in the switch-on position by a powerful magnet.

In a preferred embodiment of the invention the plate spring, in its span of movement between abutting the stop and abutting the first contact, is prestressed by contact with the bimetallic strip. The bimetallic strip abuts the plate spring at a position between the fixed end of the plate spring and the free end of the plate spring. The plate spring at its free end is formed with a resilient tongue, and the end of tongue abuts a stop member fixed on the housing. The tongue also provides prestressing of the plate spring and the tongue is curved outwardly from the plane of the plate spring.

The resilient tongue is formed by stamping out the tongue in a U-shape from the plate spring so that the connection between the plate spring and the tongue is formed at the free end of the plate spring.

A stepped pin extending substantially perpendicular to the longitudinal direction of the plate spring is mounted on the control housing. The stepped pin partially penetrates through the slit formed by the U-shaped stamping in the plate spring so that the free end of the resilient tongue abuts the pin in the area of the step.

The bimetallic strip may include an opening through which the plate spring is inserted and with the edges of the opening constituting cutting edges, providing a substantially point shaped abutment of the bimetallic strip with the plate spring. The bimetallic strip is arranged substantially parallel to the plate spring and with the free end of the bimetallic strip forming a right angularly bent portion, which portion abuts the plate spring.

The stop may be a pin mounted from a lateral wall of the control housing and positioned within the path of movement of the plate spring.

The prestressing provided by the bimetallic strip is preferably adjustable for setting the switching temperature. The prestressing provided by the bimetallic strip may be adjustable by means of a threaded spindle located adjacent the bimetallic strip, and the spindle threaded through a nut fixed in the housing.

In a preferred embodiment of the invention, the threaded spindle is made watertight by passing through a closure at the open end of the aquarium heater. The threaded spindle includes an operating knob carrying an indicator element which indicates on a scale the angular position of the threaded spindle. The angular position represents the switching temperature.

The following description of the preferred embodiment of the invention serves, in conjunction with the drawing, to further explain the invention.

FIG. 1 is an aquarium heater with its outer housing partially broken away, and

FIG. 2 is an enlarged sectional view taken on line 2—2 of FIG. 1.

The aquarium heater illustrated in FIG. 1 is enclosed in a tubular glass housing 2, which housing is closed at its lower end and open at its upper end.

The upper end of the housing 2 is closed by a plug 3 made of a resilient material, such as soft polyvinylchloride. The plug 3 includes peripheral ribs 4 which abuts in sealing contact with an expanded area of the interior wall of the glass housing 2. The plug 3 and the expanded area of the glass housing 2 are coved by a dome 7, formed of a cap 5 and a sleeve 6, and with the sleeve 6 including an inwardly directed edge 8 which contacts the glass housing 2 below the expanded area of the glass housing 2 to prevent the dome 7 from being easily pulled off. An electric cord 9 and a threaded spindle 10 are maintained in watertight relationship as they pass through cap 5 and the plug 3.

A control housing 12 has an upper end 20 pushed into a corresponding cavity 11 in the plug 3 from below and is maintained there under pressure from the flexible plug 3. The housing 12 is preferably made of an electrically insulated plastic material.

Extending from the control housing 12, two connecting wires 35 and 48 run through corresponding openings in a plug 15, which plug 15 has been pushed into the glass housing 2 below the control housing 12. The plug 15 also has peripheral ribs 16 for sealing purposes. The connecting wires 35 and 48 are connected in the area below the plug 15 with the ends of a heating wire winding 17 which winding is wrapped around a tubular carrier 18. The space below the plug 15 is filled with sand 19 in order to improve the heat transfer between the heating wire and the wall of the glass housing.

The control housing 12, as shown in more detail in FIG. 2, includes the upper holding end 20 that is slid into the cavity 11 and with the thread spindle 10 and wire 9 passing through the end 20. Below the holding end 20 a bimetallic strip 21 is mounted on the central housing by means of a screw 22 and a nut 23. Starting from the vertical place of fixation, the bimetallic strip is twice right angularly bent in opposite directions. Therefore, below the vertical area of fixation 24, a horizontal section 26 extends through an opening 25 in the control housing and the further portion of the bimetallic strip is a substantially vertical extending section 27. At the free end the bimetallic strip 21 is again bent right angularly, and with the front end of the bent portion 28 protruding into an opening 29 in a vertical support wall 30 of the control housing.

A first contact 33 is mounted on the vertical support wall 30. Two lateral walls 31 and 32 extend vertically from the support wall 30. The contact 33 is connected to the end of a cable wire 34 of line cord 9, which cord is brought through the holding member 20. The actual connection between the wire 34 and the contact 33 is not shown in the drawing, and the cable wire 34 is illustrated unattached but located adjacent to the contact 33. The connection may of course be made in any known manner, such as by soldering or by a plug-in connection. The second cable wire 35 of line cord 9 passes along the control housing 12 to be attached to the heating wire winding 17. Below the opening 29 in the vertical support wall 30, a resilient plate spring 36 is fastened at one end by means of a screw 37 and a nut 38. The plate spring 36 projects through an opening 39 in the horizontal portion 28 of the bimetallic strip 21 and the spring 36 carries at its free end a second contact 40, lying oppositely contact 33. The front part of the plate spring 36 is stamped out to be U-shaped to form a resilient tongue 41 extending from the free end of the plate spring and back to the middle of the plate spring. A slit 42 is formed by the stamping out of the tongue 41 in the plate spring and at the rear end of the slit 42 a stepped pin 43, attached to the support wall 30, projects partially through the slit 42. The free end 44 of the resilient tongue 41 contacts step 45 of the pin 43 so that the resilient tongue 41 is bent to lie outside the plane of the plate spring 36. The step 45 is located substantially in the plane of the plate spring 36.

A pin shaped stop 46 extends from the lateral wall 31 and protrudes into the path of movement of the plate spring 36.

The edge of the opening 39, adjacent the lateral wall 30, abuts in the section between the end of slit 42 and the fixed end of the plate spring, and the bimetallic strip puts the plate spring under prestress.

According to the position of the bimetallic strip 21 the plate spring may, due to the prestress described above, and also because of the prestress exerted by the resilient tongue, adopt two stable positions. These positions are a closed position when the contacts 33 and 40 lie in contact with one another, and an open position when the contacts are separated from one another and the plate spring 36 abuts stop 46. The open position is shown in FIG. 2. The plate spring moves across an unstable position between the open and closed positions, and in order to cause the plate spring to snap from one stable position to the other stable position a very slight movement of the bimetallic strip is needed. The movement of the bimetallic strip causes a more or less strong support of the plate spring at the point of abutment.

The edge of the opening 39 abutting the plate spring 36 may be formed with a cutting edge, so that the bimetallic strip only abuts the plate spring along a sharp point.

The plate spring 36 is formed of a resilient, electrically conducting material, for example spring steel.

The plate spring 36 is electrically connected with a wire 48 using a contact lug 47. The lug is mounted to the control housing by means of the screw 37 and the nut 38. The wire 48 is connected to the other end of the heating wire winding 17.

The threaded spindle 10 passes through the holding member 20 and is screwed into a nut 49 which is held in a fixed position by the control housing. The free end of the threaded spindle 10 abuts the horizontal section 26 of the bimetallic strip 21, and with the prestress of the bimetallic strip changeable by rotation of the threaded spindle 10.

An indication of the angular position of the threaded spindle is provided by an operating knob 50 mounted at the outside end of the threaded spindle, which knob includes a pointer-like projection 51. The projection 51 provides an angular position indication on a scale (not shown on the drawing) on the cover 5 of the dome 7. The maximum rotation of the threaded spindle is limited by two stops 52 and 53.

In operation of the present invention the plate spring 36 may snap from the open position, as shown in FIG. 2, into the closed position when the bimetallic strip moves in accordance with a temperature change, so that the plate spring is less strongly supported by the bimetallic strip. This is when the plate spring is less strongly drawn from support wall 30 by the bimetallic spring.

The transition from the open to the closed position occurs suddenly since the plate spring snaps from one position to the other. In this way the present invention provides a stable position because the return snapping of the plate spring requires an even stronger support of the plate spring by the bimetallic strip. The present invention therefore achieves the same effect as with the known use of magnets which are used to hold the bimetallic strip in the closed position. However, the present invention reacts substantially more sensitively to slight movements of the bimetallic strip and therefore provides for control with smaller temperature changes.

In order to adjust the point of switching, the prestress of the plate spring by the bimetallic strip may be changed by way of a variable deeper penetration of the threaded spindle.

Although the invention has been described with reference to a particular embodiment, it is to be appreciated that various adaptations and modifications may be made and the invention is only to be limited by the appended claims.

I claim:

1. A temperature control device for use with an aquarium heater, including
    a control housing,
    a first contact fastened to the control housing,
    a second contact responsive to the temperature responsive movement of a bimetallic strip maintained at the control housing and movable between a closed position wherein the second contact abuts the first contact, and an open position wherein the second contact is separated from the first contact,
    a plate spring,
    a second contact fastened at the free end of the plate spring and with the plate spring mounted on the control housing and movable through an unstable intermediate position between a first stable position wherein the contacts lie abuting one another and a second stable position wherein the contacts are separated from one another,
    the plate spring abuting a stop on the control housing and with the bimetallic strip abuting the plate spring and moving the plate spring in response to temperature changes between the first and second positions, and
    wherein the plate spring in its movement between abuting the stop and abuting the contact is prestressed by abutment with the bimetallic strip and with the abutment of the plate spring with the bimetallic strip in the area between the fixed mounting of the plate spring on the control housing and the free end of the plate spring, and wherein the plate spring carries at its free end a resilient tongue and with a free end of the tongue abuting a stop fixed to the housing so that the tongue curves outwardly from the plane of the plate spring and provides a prestress of the plate spring.

2. The temperature control device of claim 1 wherein the resilient tongue is formed by a U-shaped stamping of the plate spring to have the tongue extend from the free end of the plate spring.

3. The temperature control device of claim 2, wherein the control housing includes a stepped pin extending substantially perpendicular to the longitudinal direction of the plate spring, and with the pin partially projecting through a slit formed by the U-shaped stamping of the plate spring to have the free end of the resilient tongue abuting the pin in the area of the step of the pin.

4. The temperature control device of claim 1, wherein the bimetallic strip is substantially parallel to the plate spring and with the bimetallic strip including at its free end a right angularly bent portion for abuting the plate spring.

5. The temperature control device of claim 1, wherein the stop is a pin mounted on a lateral wall of the control housing and with the stop pin protruding in the path of movement of the plate spring.

6. The temperature control device of claim 1, wherein the bimetallic strip is adjustably prestressed.

7. The temperature control device of claim 6, wherein the prestressing of the bimetallic strip is adjustable by means of a threaded spindle threaded through a nut fixed in the housing and with the end of the spindle abutting the bimetallic strip.

8. The temperature control device of claim 7, wherein the threaded spindle is watertight by a closure at the end of the aquarium heater and with the spindle including an operating knob carrying an indicating element to indicate the switching temperature on a scale on the closure in accordance with the angular position of the threaded spindle.

9. A temperature control device for use with an aquarium heater, including
    a control housing,
    a first contact fastened to the control housing,
    a second contact responsive to the temperature responsive movement of a bimetallic strip maintained at the control housing and movable between a closed position wherein the second contact abuts the first contact, and an open position wherein the second contact is separated from the first contact,
    a plate spring,
    a second contact fastened at the free end of the plate spring and with the plate spring mounted on the control housing and movable through an unstable intermediate position between a first stable position wherein the contacts lie abuting one another and a second stable position wherein the contacts are separated from one another,
    the plate spring abuting a stop on the control housing and with the bimetallic strip abuting the plate spring and moving the plate spring in response to temperature changes between the first and second positions, and
    wherein the bimetallic strip includes an opening through which the plate spring passes, and with the edges of the opening formed with cutting edges to provide a substantially pointed abutment of the bimetallic spring with the plate spring.

10. A temperature control device for use with an aquarium heater, including
    a control housing,
    a first contact fastened to the control housing,
    a second contact responsive to the temperature responsive movement of a bimetallic strip maintained at the control housing and movable between a closed position wherein the second contact abuts the first contact, and an open position wherein the second contact is separated from the first contact,
    a plate spring,
    a second contact fastened at the free end of the plate spring and with the plate spring mounted on the control housing and movable through an unstable intermediate position between a first stable position wherein the contacts lie abuting one another and a second stable position wherein the contacts are separated from one another,
    the plate spring abuting a stop on the control housing and with the bimetallic strip abuting the plate spring and moving the plate spring in response to temperature changes between the first and second positions, and
    wherein the bimetallic strip is adjustably prestressed, and
    wherein the prestressing of the bimetallic strip is adjustable by means of a threaded spindle threaded through a nut fixed in the housing and with the end of the spindle abutting the bimetallic strip, and
    wherein the threaded spindle is watertight by a closure at the end of the aquarium heater and with the spindle including an operating knob carrying an indicating element to indicate the switching temperature on a scale on the closure in accordance with the angular position of the threaded spindle.

* * * * *